(12) United States Patent
Nishimoto et al.

(10) Patent No.: US 12,442,630 B2
(45) Date of Patent: Oct. 14, 2025

(54) ELECTRONIC DEVICE

(71) Applicant: Murata Manufacturing Co., Ltd., Nagaokakyo (JP)

(72) Inventors: Keisuke Nishimoto, Nagaokakyo (JP); Hidekazu Kano, Nagaokakyo (JP); Shiori Nagamori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 398 days.

(21) Appl. No.: 17/869,905

(22) Filed: Jul. 21, 2022

(65) Prior Publication Data
US 2022/0357145 A1 Nov. 10, 2022

Related U.S. Application Data

(63) Continuation of application No. PCT/JP2021/039324, filed on Oct. 25, 2021.

(30) Foreign Application Priority Data

Nov. 9, 2020 (JP) .................. 2020-186234

(51) Int. Cl.
*G01B 7/30* (2006.01)
*H04M 1/02* (2006.01)

(52) U.S. Cl.
CPC ............. *G01B 7/30* (2013.01); *H04M 1/0214* (2013.01)

(58) Field of Classification Search
CPC ...................................................... G01B 7/30
See application file for complete search history.

(56) References Cited

U.S. PATENT DOCUMENTS

| | | | |
|---|---|---|---|
| 8,564,949 B2 * | 10/2013 | Du | G06F 1/1679 |
| | | | 361/679.55 |
| 11,971,743 B2 * | 4/2024 | Tyagi | G06F 1/1641 |
| 2010/0114524 A1 | 5/2010 | Saito et al. | |
| 2024/0201740 A1 * | 6/2024 | Zhang | H04M 1/0206 |

FOREIGN PATENT DOCUMENTS

| | | |
|---|---|---|
| JP | H11236996 A | 8/1999 |
| JP | 2008139300 A | 6/2008 |
| JP | 2009265757 A | 11/2009 |
| WO | 2019069729 A1 | 4/2019 |

OTHER PUBLICATIONS

International Search Report in PCT/JP2021/039324, mailed Jan. 18, 2022, 3 pages.

* cited by examiner

*Primary Examiner* — Reena Aurora
(74) *Attorney, Agent, or Firm* — ArentFox Schiff LLP

(57) ABSTRACT

An electronic device is provided that includes a first body, a second body having a structure that rotates with respect to the first body about a central axis, a first sensor that outputs a first detection signal having a first output value indicating that an open angle formed by the first body and the second body is a reference angle, a second sensor that outputs a second detection signal having a second output value that changes under an influence of a change in the open angle, and a control unit that calculates the open angle based on the first detection signal and the second detection signal.

10 Claims, 20 Drawing Sheets

FULLY OPEN STATE (Θ = 180°)

FULLY CLOSED STATE (Θ = 0°)

| INDEX INTEGRAL VALUE I1 = IA | |
|---|---|
| SECOND OUTPUT INTEGRAL VALUE I2 | OPEN ANGLE Θ |
| a11 | θ11 |
| a12 | θ12 |
| a13 | θ13 |
| a14 | θ14 |
| ... | ... |
| ... | ... | a11 < a12 < a13 < a14 < ···
θ11 > θ12 > θ13 > θ14 > ···

| INDEX INTEGRAL VALUE I1 = IB | |
|---|---|
| SECOND OUTPUT INTEGRAL VALUE I2 | OPEN ANGLE Θ |
| a21 | θ11 |
| a22 | θ12 |
| a23 | θ13 |
| a24 | θ14 |
| ... | ... |
| ... | ... | a21 < a22 < a23 < a24 < ···

| INDEX INTEGRAL VALUE I1 = IC | |
|---|---|
| SECOND OUTPUT INTEGRAL VALUE I2 | OPEN ANGLE Θ |
| a31 | θ11 |
| a32 | θ12 |
| a33 | θ13 |
| a34 | θ14 |
| ... | ... |
| ... | ... | a31 < a32 < a33 < a34 < ··· a11 < a21 < a31 < ···
a12 < a22 < a32 < ···
a13 < a23 < a33 < ···
a14 < a24 < a34 < ···

ELECTRONIC DEVICE

CROSS REFERENCE TO RELATED APPLICATIONS

This application is a continuation of PCT Application No. PCT/JP2021/039324, filed Oct. 25, 2021, which claims priority to Japanese Patent Application No. 2020-186234, filed Nov. 9, 2020, the entire contents of each of which are hereby incorporated by reference in their entirety.

TECHNICAL FIELD

The present invention relates to an electronic device including a first body and a second body having a structure that rotates with respect to the first body.

BACKGROUND

WO 2019/069729 A (hereinafter "Patent Document 1") discloses a conventional electronic device that includes a housing, a pressing sensor, and a state detection part. The housing has a foldable structure and the pressing sensor is provided in a curved part that is curved when the housing is folded. Moreover, the pressing sensor includes a piezoelectric film that deforms to stretch when the housing is folded. This folding causes the pressing sensor to output a signal having a voltage corresponding to the stretching amount of the piezoelectric film. The state detection part can then detect an angle formed by the housing based on the signal of the pressing sensor.

In the electronic device described in Patent Document 1, the piezoelectric sensor typically outputs a signal indicating a speed (e.g., an angular velocity) at which an angle formed by the housing changes. The state detection part detects the angle by integrating the output value of the signal output from the pressing sensor. In this case, when a noise is included in the signal output from the pressing sensor, the noise is also integrated as a part of the output value. In addition, stress relaxation occurs in the pressing sensor in some cases. When the signal output from the pressing sensor includes an error due to stress relaxation, the error is integrated as a part of the output value. With repeating opening and closing of the housing, noises and errors accumulate. As a result, it may become difficult for the state detection part to accurately detect the angle formed by the housing.

SUMMARY OF THE INVENTION

Accordingly, it is an object of the present invention to provide an electronic device configured to accurately calculate an open angle formed by a first body and a second body.

In an exemplary aspect, an electronic device is provided that includes a first body; a second body having a structure that rotates with respect to the first body about a central axis; a first sensor that outputs a first detection signal having a first output value indicating that an open angle formed by the first body and the second body is a reference angle; a second sensor that outputs a second detection signal having a second output value used for calculating a change of the open angle as the second body rotates with respect to the first body; and a control unit that calculates the open angle based on the first detection signal and the second detection signal.

In another exemplary aspect, an electronic device is provided that includes a first body; a second body the rotates with respect to the first body about a central axis; and a flexible coupling member including a first fixing part fixed to the first body, a second fixing part fixed to the second body, and a non-fixing part provided between the first fixing part and the second fixing part and not fixed to the first body or the second body. Moreover, the flexible coupling member deforms when the second body rotates with respect to the first body. In addition, a first sensor is attached to the non-fixing part and the first sensor outputs a first detection signal having a first output value indicating that an open angle formed by the first body and the second body is a reference angle when the non-fixing part deforms.

For purposes of this disclosure, X, Y, and Z are structures included in the electronic device. More particularly, X being supported by Y includes a case where X is attached to Y so as not to be movable with respect to Y (that is, X is fixed or held) and a case where X is attached to Y so as to be movable with respect to Y. Further, X being supported by Y includes both a case where X is directly attached to Y and a case where X is attached to Y by using Z.

In the present disclosure, X and Y being arranged in the front-back direction refers to the following state. When X and Y are viewed in a direction perpendicular to the front-back direction, both X and Y are disposed on a straight line indicating the front-back direction. In the present specification, X and Y being arranged in the front-back direction as viewed in the up-down direction refers to the following state. When X and Y are viewed in the up-down direction, both X and Y are disposed on a straight line indicating the front-back direction. In this case, when X and Y are viewed from the left-right direction different from the up-down direction, one of X and Y does not have to be disposed on a straight line indicating the front-back direction. X and Y may be in contact with each other. X and Y may be separated from each other. Z may be present between X and Y. These definitions also apply to directions other than the front-back direction.

In the present disclosure, X being disposed in front of Y refers to the following state. A part of X is disposed in a region through which Y passes when Y translates in the front direction. Therefore, X may be accommodated in the region through which Y passes when Y translates in the front direction, or may protrude from the region through which Y passes when Y translates in the front direction. In this case, X and Y are arranged in the front-back direction. These definitions also apply to directions other than the front-back direction.

In the present disclosure, X being disposed forward from Y means the following state. X is disposed in front of a plane passing through the front end of Y and orthogonal to the front-back direction. In this case, X and Y may be arranged in the front-back direction but does not have to be arranged in the front-back direction. These definitions also apply to directions other than the front-back direction.

In the present disclosure, each part of X is defined as follows unless otherwise specified. A front part of X means the front half of X. A back part of X means the back half of X. A left part of X means the left half of X. A right part of X means the right half of X. An upper part of X means the upper half of X. A lower part of X means the lower half of X. A front end of X means the end of X in the forward direction. A back end of X means the end of X in the backward direction. A left end of X means the end of X in the leftward direction. A right end of X means the end of X in the rightward direction. An upper end of X means the end of X in the upward direction. A lower end of X means the end of X in the downward direction. A front end part of X means the front end of X and the vicinity thereof. A back end part of X means the back end of X and the vicinity thereof. A left end part of X means the left end of X and the vicinity thereof. A right end part of X means the right end of X and the vicinity thereof. An upper end part of X means the upper end of X and the vicinity thereof. A lower end part of X means the lower end of X and the vicinity thereof.

According to the exemplary aspects, the electronic device is configured to accurately calculate the open angle formed by the first body and the second body.

BRIEF DESCRIPTION OF DRAWINGS

FIG. 13 is an open angle calculation table illustrating a relationship between a second output integral value I2 and an open angle θ.

DETAILED DESCRIPTION

Exemplary Embodiment

[Configuration of Electronic Device]

Figure 1:
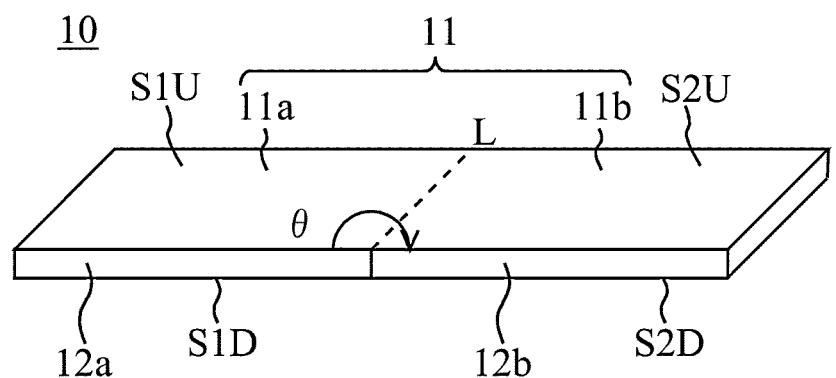
FIG. 1 is a configuration diagram of an electronic device 10.
Figure 1:
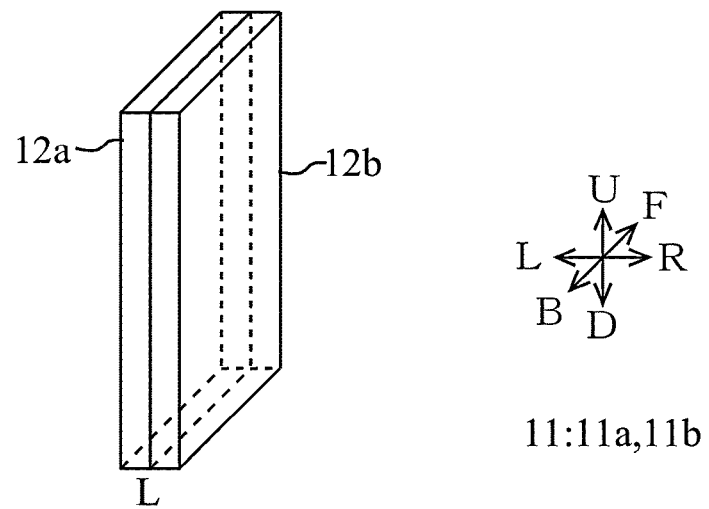
Figure 2:
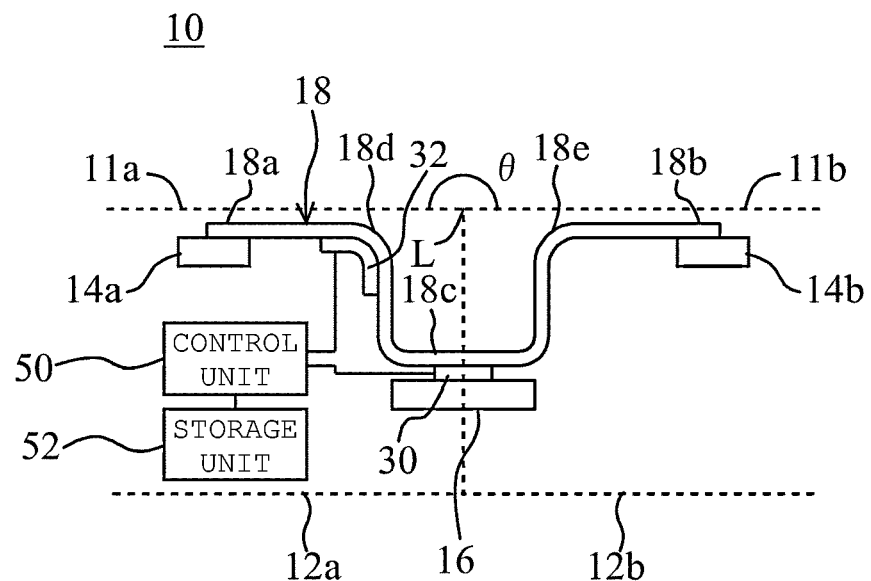
FIG. 2 is a sectional view of the vicinity of a coupling part between a first body 12a and a second body 12b of the electronic device 10.
Figure 2:
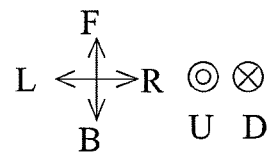

Hereinafter, a configuration of an electronic device 10 according to an exemplary embodiment will be described with reference to the drawings. FIG. 1 is a configuration diagram of the electronic device 10. FIG. 2 is a sectional view of the vicinity of a coupling part between a first body 12a and a second body 12b of the electronic device 10.

In the present disclosure, the directions are defined as follows. As illustrated in FIG. 1, the second body 12b has a structure that rotates with respect to the first body 12a about a central axis L. The direction in which the central axis L extends is defined as a front-back direction. The angle formed by the first body 12a and the second body 12b is defined as an open angle θ. The direction in which a bisector of the open angle θ extends is defined as an up-down direction. The front-back direction and the up-down direction are orthogonal to each other. The direction orthogonal to the front-back direction and the up-down direction is defined as a left-right direction. It is noted that the definition of the directions in the present disclosure is an example. Therefore, the directions at the time of actual use of the electronic device 10 do not need to coincide with the directions.

As illustrated in FIG. 1, the electronic device 10 is a foldable smartphone. The electronic device 10 can take the fully open state in the upper diagram of FIG. 1 and the fully closed state in the lower diagram of FIG. 1. As illustrated in FIGS. 1 and 2, the electronic device 10 includes the first body 12a, the second body 12b, a flexible coupling member 18, a first sensor 30, a second sensor 32, a control unit 50, and a storage unit 52.

The first body 12a is a left part of the electronic device 10 and has a plate shape. In the fully open state, the first body 12a has a rectangular shape as viewed in the up-down direction. In the fully open state, the first body 12a has a first upper main face S1U and a first lower main face S1D. In the fully open state, the first upper main face S1U and the first lower main face S1D have a normal line extending in the up-down direction. The first body 12a includes a first display 11a and a first housing 14a. The first display 11a includes the first upper main face S1U of the first body 12a. The first housing 14a supports the first display 11a, a circuit board, a battery, a central processing unit (CPU), and the like.

The second body 12b is a right part of the electronic device 10. Therefore, the second body 12b is located on the right of the first body 12a. The second body 12b has a plate shape. In the fully open state, the second body 12b has a rectangular shape as viewed in the up-down direction. In the fully open state, the second body 12b has a second upper main face S2U and a second lower main face S2D. In the fully open state, the second upper main face S2U and the second lower main face S2D have a normal line extending in the up-down direction. The second body 12b includes a second display 11b and a second housing 14b. The second display 11b includes the second upper main face S2U of the second body 12b. The second housing 14b supports the second display 11b, a circuit board, a battery, a CPU, and the like.

In the exemplary aspect, the first display 11a and the second display 11b are one flexible display 11. Moreover, the flexible display 11 can be configured to display a video image to the user. In the fully open state, the flexible display 11 emits light in the upward direction. The flexible display 11 has a sheet shape having a rectangular shape. The flexible display 11 has a bendable structure. The flexible display 11 is realized by, for example, one organic EL display.

As described above, the second body 12b has a structure that rotates with respect to the first body 12a about the central axis L. The central axis L extends in the front-back direction and is located at a boundary between the first upper main face S1U of the first body 12a and the second upper main face S2U. As described above, the angle formed by the first body 12a and the second body 12b is defined as an open angle θ. In the present embodiment, the open angle θ is an angle formed by the first upper main face S1U (that is, first display 11a) of the first body 12a and the second upper main face S2U (that is, the second display 11b) of the second body 12b. The open angle θ is 180° in the fully open state. The open angle θ is 0° in the fully closed state.

As illustrated in FIG. 2, the flexible coupling member 18 is a flexible sheet. The flexible coupling member 18 includes a first fixing part 18a, a second fixing part 18b, and a non-fixing part 18c. The first fixing part 18a is a left end part of the flexible coupling member 18. The first fixing part 18a is fixed to the first body 12a. In the present embodiment, when the open angle θ is 180°, the first fixing part 18a is fixed to an upper main face of the first housing 14a. Likewise, the second fixing part 18b is a right end part of the flexible coupling member 18. The second fixing part 18b is fixed to the second body 12b. In the present embodiment, when the open angle θ is 180°, the second fixing part 18b is fixed to an upper main face of the second housing 14b.

Moreover, the non-fixing part 18c is provided between the first fixing part 18a and the second fixing part 18b. A left end part of the non-fixing part 18c is connected to the first fixing part 18a. A right end part of the non-fixing part 18c is connected to the second fixing part 18b. The non-fixing part 18c is not fixed to the first body 12a or the second body 12b. Therefore, the non-fixing part 18c can deform in a state where the open angle θ does not change. As further shown, the non-fixing part 18c is curved so as to protrude downward from the first fixing part 18a and the second fixing part 18b as viewed in the front-back direction. Therefore, the non-fixing part 18c has a U shape as viewed in the front-back direction. It is noted that the distance between the first housing 14a and the second housing 14b in the left-right direction is wide. The left part of the non-fixing part 18c has a left curved part 18d that is bent leftward as viewed in the front-back direction when the open angle θ is 180°. This configuration causes the left part of the non-fixing part 18c to have a shape in which the left part of the U shape and a part extending leftward from the upper end of the left part of the U shape are combined. The right part of the non-fixing part 18c has a right curved part 18e that is bent rightward as viewed in the front-back direction when the open angle θ is 180°. Moreover, this configuration causes the right part of the non-fixing part 18c has a shape in which the right part of the U shape and a part extending rightward from the upper end of the right part of the U shape are combined.

The flexible coupling member 18 as described above deforms when the second body 12b rotates with respect to the first body 12a. The flexible coupling member 18 is, for example, a flexible circuit board that electrically connects the first body 12a and the second body 12b. Therefore, the flexible coupling member 18 is used for transmission of a signal between the first body 12a and the second body 12b in an exemplary aspect.

The first sensor 30 is attached to the non-fixing part 18c. In the present embodiment, the first sensor 30 is attached to a lower end part of the non-fixing part 18c. The first sensor 30 is attached to the outer peripheral face of the lower end part of the non-fixing part 18c. The first sensor 30 outputs a first detection signal Sig1 having a first output value indicating that the open angle θ formed by the first body 12a and the second body 12b is a reference angle θ0 when the non-fixing part 18c deforms. In the exemplary aspect, the reference angle θ0 is, for example, 150° or more and 160° or less. The reference angle θ0 is, for example, 160°. The first detection signal Sig1 has the first output value of a voltage higher than a reference voltage V0 in the vicinity of the reference angle θ0. On the other hand, the first detection signal Sig1 has the first output value of the reference voltage V0 except the vicinity of the reference angle θ0. Therefore, the first detection signal Sig1 is a signal used for determining whether the open angle θ is the reference angle θ0.

Moreover, a contact member 16 is provided under the non-fixing part 18c in the exemplary aspect. As illustrated in FIG. 2, the contact member 16 is in contact with the first sensor 30 when the open angle θ is 180°. The first sensor 30 receives an upward force from the contact member 16. The lower end part of the non-fixing part 18c receives an upward force from the contact member 16.

As further shown, the second sensor 32 is attached to the left curved part 18d. In the present embodiment, the second sensor 32 is attached to the inner peripheral face of the left curved part 18d. The second sensor 32 outputs a second detection signal Sig2 having a second output value used for calculating the open angle θ that changes as the second body 12b rotates with respect to the first body 12a. In the present embodiment, the second output value is a voltage that changes with the angular velocity of the open angle θ.

Figure 3:
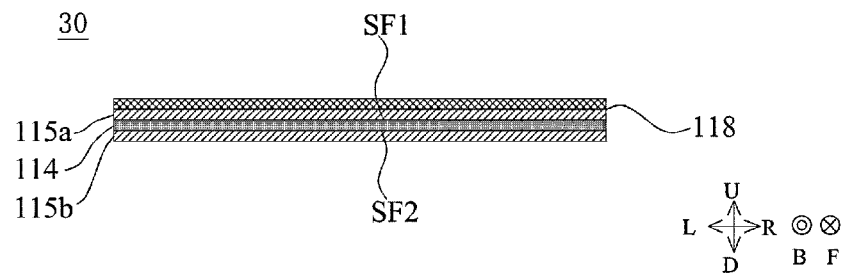
FIG. 3 is a sectional view of a first sensor 30 at the center in the front-back direction.

Here, structures of the first sensor 30 and the second sensor 32 will be described with reference to the drawings. In particular, FIG. 3 is a sectional view of the first sensor 30 at the center in the front-back direction. Since the structure of the second sensor 32 is the same as the structure of the first sensor 30, the structure of the first sensor 30 will be described below.

As shown, the first sensor 30 has a thin shape in an exemplary aspect. More particularly, as illustrated in FIG. 3, the first sensor 30 includes a piezoelectric body 114, an upper electrode 115a, a lower electrode 115b, and an adhesive layer 118. As illustrated in FIG. 3, the piezoelectric body 114 has a film shape. Therefore, the piezoelectric body 114 has an upper main face SF1 and a lower main face SF2. The length of the piezoelectric body 114 in the left-right direction is longer than the length of the piezoelectric body 114 in the front-back direction. In the present embodiment, the piezoelectric body 114 has a rectangular shape having long sides extending in the left-right direction as viewed in the up-down direction. In operation, the piezoelectric body 114 is configured to generate a voltage (hereinafter, the first output value) corresponding to a deformation amount of the piezoelectric body 114. The material of the piezoelectric body 114 is, for example, polylactic acid. Hereinafter, the piezoelectric body 114 will be described in more detail.

The piezoelectric body 114 has a property that the polarity of the output voltage generated when the piezoelectric body 114 stretches in the left-right direction is opposite to the polarity of the second output value generated when the piezoelectric body 114 stretches in the front-back direction.

Specifically, the piezoelectric body 114 is a film formed of a chiral polymer. The chiral polymer is, for example, polylactic acid (PLA), in particular, poly-L-lactic acid (PLLA). The main chain of PLLA made of a chiral polymer has a helical structure. PLLA has piezoelectricity in which molecules are oriented when uniaxially stretched. The piezoelectric body 114 has a piezoelectric constant of $d_{14}$. The uniaxial stretching direction (e.g., an orientation direction) of the piezoelectric body 114 forms an angle of 45 degrees with respect to each of the front-back direction and the left-right direction. The 45 degrees include, for example, an angle including about 45 degrees±10 degrees. This configuration causes the piezoelectric body 114 to generate the first output value when stretching in the left-right direction or stretching in the front-back direction. For example, the piezoelectric body 114 generates a positive first output value when stretching in the left-right direction. For example, the piezoelectric body 114 generates a negative first output value when stretching in the front-back direction. The magnitude of the first output value depends on a value obtained by time-differentiating a deformation amount of the piezoelectric body 114 due to stretch.

The upper electrode 115a is a signal electrode that outputs the first detection signal Sig1 having the first output value. As illustrated in FIG. 3, the upper electrode 115a is provided on the upper main face SF1 and covers substantially the whole upper main face SF1. Moreover, the lower electrode 115b is a ground electrode and is connected to a ground potential. As illustrated in FIG. 3, the lower electrode 115b is provided on the lower main face SF2. Thus, the piezoelectric body 114 is positioned between the upper electrode 115a and the lower electrode 115b. The lower electrode 115b covers substantially the whole lower main face SF2. In an exemplary aspect, the upper electrode 115a and the lower electrode 115b are, for example, an inorganic electrode such as indium tin oxide (ITO) or zinc oxide (ZnO), an organic electrode such as PeDOT or conductive polyaniline, a metal film by vapor deposition or plating, or a printed electrode film with a silver paste.

The adhesive layer 118 fixes the piezoelectric body 114, the upper electrode 115a, and the lower electrode 115b to the non-fixing part 18c. This configuration causes the deformation of the non-fixing part 18c to transmit to the piezoelectric body 114. The adhesive layer 118 is, for example, an acrylic, a rubber-based, a silicone-based, or a urethane-based pressure-sensitive adhesive. The adhesive layer 118 is selected according to an adherend and required adhesive strength.

In operation, the control unit 50 is configured to calculate the open angle θ based on the first detection signal Sig1 and the second detection signal Sig2. Moreover, the control unit 50 is, for example, a CPU.

The storage unit 52 stores a reference angle integral value I0 described later. Moreover, in the exemplary aspect, the storage unit 52 is, for example, a memory.

[Operation of Electronic Device 10]

Figure 8:
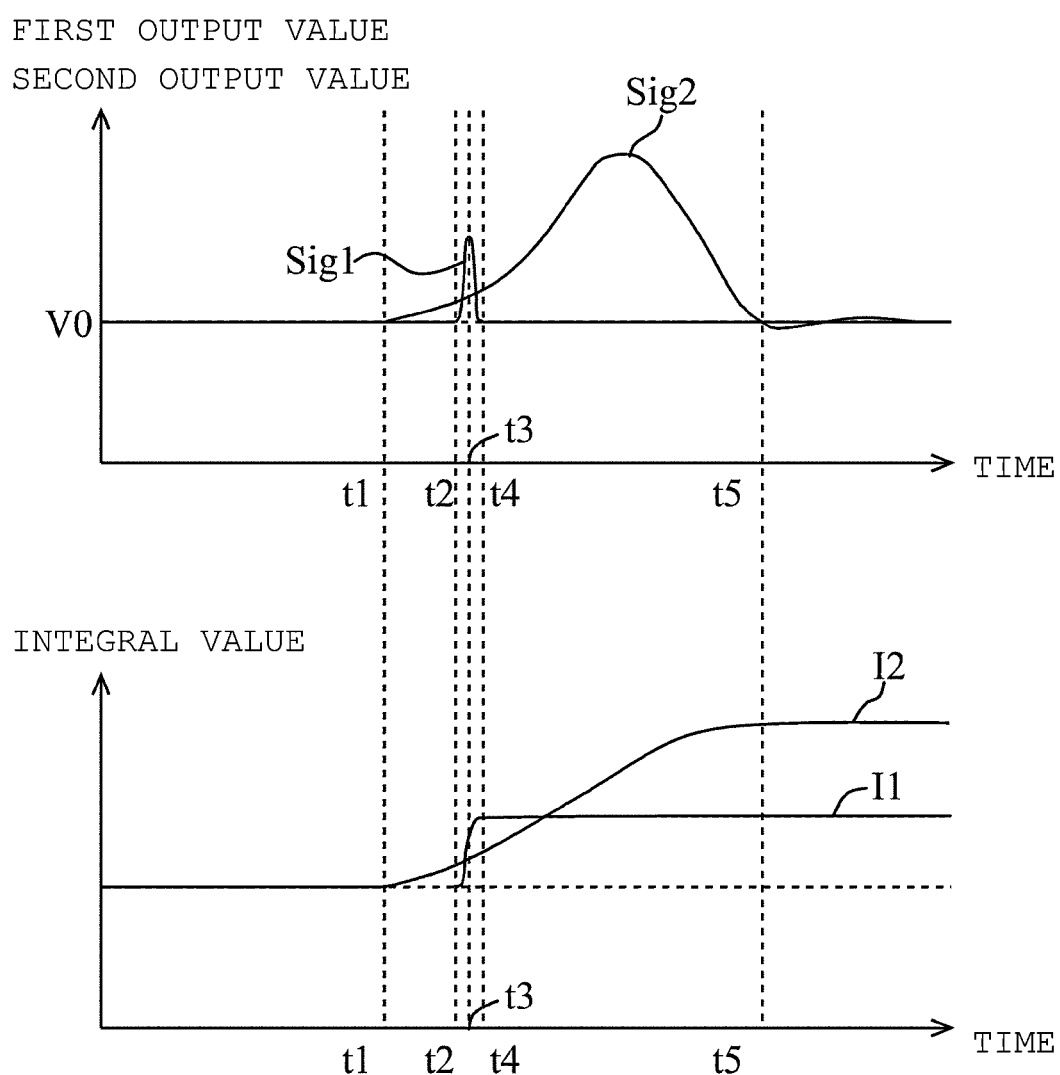
FIG. 8 is a graph illustrating waveforms of a first detection signal Sig1 and a second detection signal Sig2.

Next, an operation of the electronic device 10 will be described with reference to the drawings. FIGS. 4 to 7 are sectional views of the vicinity of a coupling part between the first body 12a and the second body 12b of the electronic device 10. FIG. 8 includes graphs illustrating waveforms of the first detection signal Sig1 and the second detection signal Sig2. FIG. 8 illustrates a graph illustrating a relationship between time and the first output value of the first detection signal Sig1 and the second output value of the second detection signal Sig2. The vertical axis represents the first output value and the second output value. Moreover, the horizontal axis represents time. Further, FIG. 8 illustrates a graph illustrating a relationship between time and an integral value (hereinafter, the first output integral value I1) of the first output value of the first detection signal Sig1 and an integral value (hereinafter, the second output integral value I2) of the second output value of the second detection signal Sig2. The vertical axis represents integral value. The horizontal axis represents time.

Hereinafter, an operation in which the electronic device 10 is switched from the fully open state to the fully closed state will be described as an example. At this time, the open angle θ changes from 180° to 0° when switching states. Moreover, the angular velocity of the open angle θ increases from 0 and then decreases to 0.

As illustrated in FIG. 2, the open angle θ is 180° at time t1. At this time, the first sensor 30 is pushed upward by the contact member 16. Therefore, the lower end part of the non-fixing part 18c receives an upward force from the contact member 16. As a result, the lower end part of the non-fixing part 18c has a flat shape. At time t1, the shape of the lower end part of the non-fixing part 18c does not change. At time t1, the first sensor 30 outputs the first detection signal Sig1 having the first output value of the reference voltage V0 indicating that the shape of the first sensor 30 has not changed.

On the other hand, the second sensor 32 is attached to the inner peripheral face of the left curved part 18d. Therefore, the second sensor 32 is contracted. It is noted that the angular velocity of the open angle θ is 0 at time t1. At time t1, the shape of the left curved part 18d does not change. Therefore, the second sensor 32 outputs the second detection signal Sig2 having the second output value of the reference voltage V0 indicating that the shape of the second sensor 32 has not changed.

Figure 4:
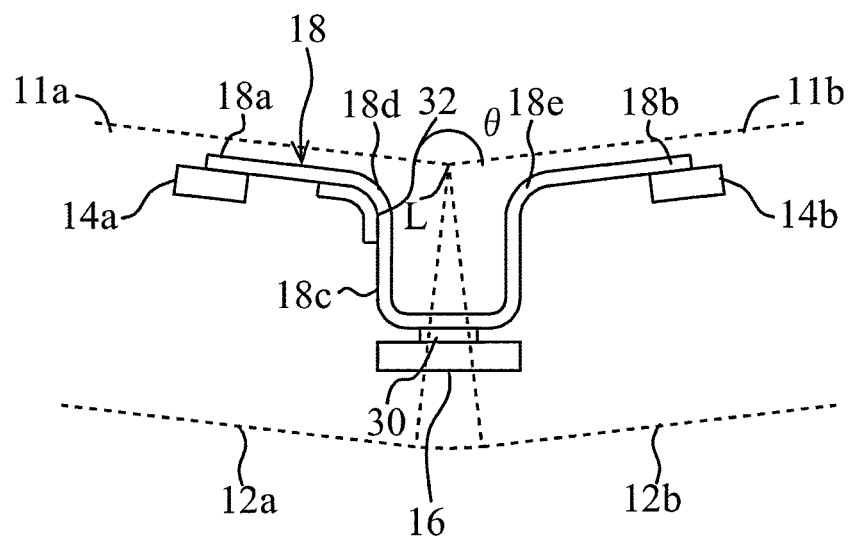
FIG. 4 is a sectional view of the vicinity of the coupling part between the first body 12a and the second body 12b of the electronic device 10.
Figure 4:
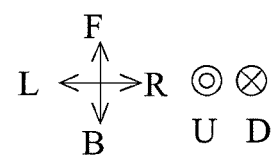

In operation of the exemplary aspect, the open angle θ decreases between time t1 and time t2. At this time, as illustrated in FIG. 4, the first sensor 30 is pushed upward by the contact member 16. Therefore, the lower end part of the non-fixing part 18c receives an upward force from the contact member 16. As a result, the lower end part of the non-fixing part 18c has a flat shape. The shape of the lower end part of the non-fixing part 18c does not change between time t1 and time t2. Therefore, the first sensor 30 outputs the first detection signal Sig1 having the first output value of the reference voltage V0 between time t1 and time t2.

In addition, the open angle θ decreases between time t1 and time t2. This increases the angle formed by the left curved part 18d. The shape of the second sensor 32 changes such that the compression amount of the second sensor 32 decreases. Therefore, the second output value of the second detection signal Sig2 becomes higher than the reference voltage V0. Moreover, the angular velocity of the open angle θ increases over time. Therefore, the second output value of the second detection signal Sig2 increases between time t1 and time t2. The second output integral value I2 increases between time t1 to time t2.

Figure 5:
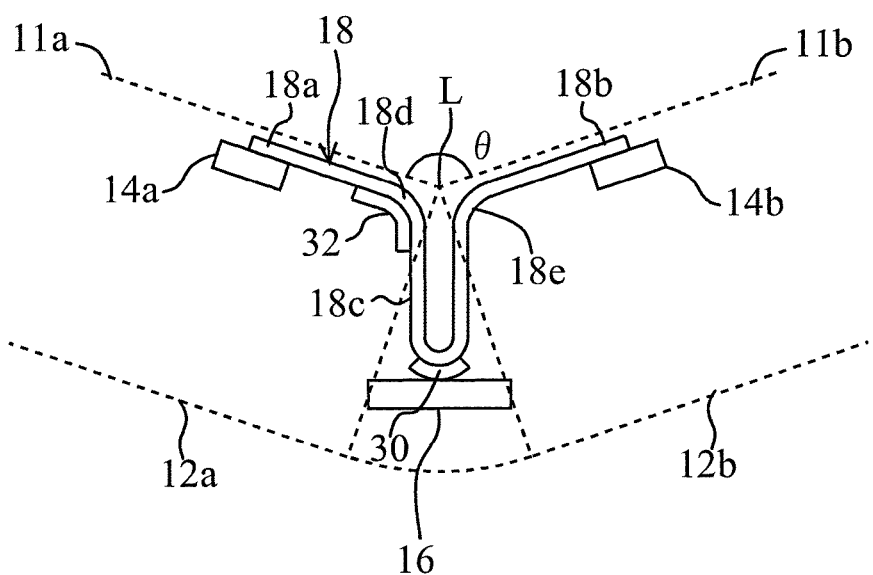
FIG. 5 is a sectional view of the vicinity of the coupling part between the first body 12a and the second body 12b of the electronic device 10.
Figure 5:
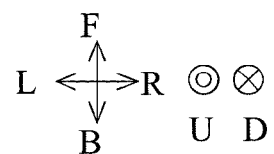
Figure 6:
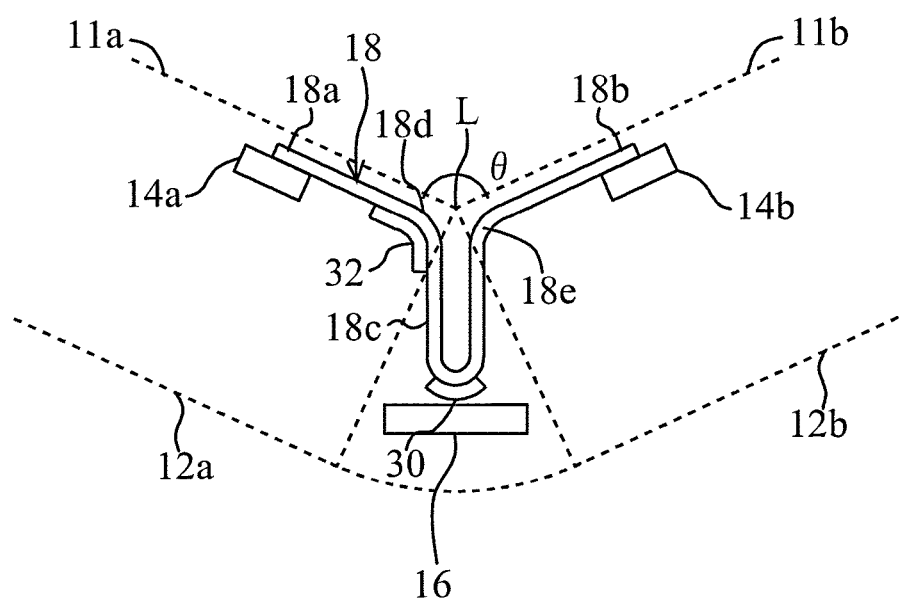
FIG. 6 is a sectional view of the vicinity of the coupling part between the first body 12a and the second body 12b of the electronic device 10.
Figure 6:
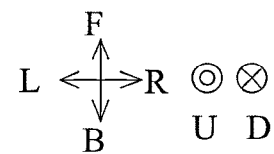
Figure 7:
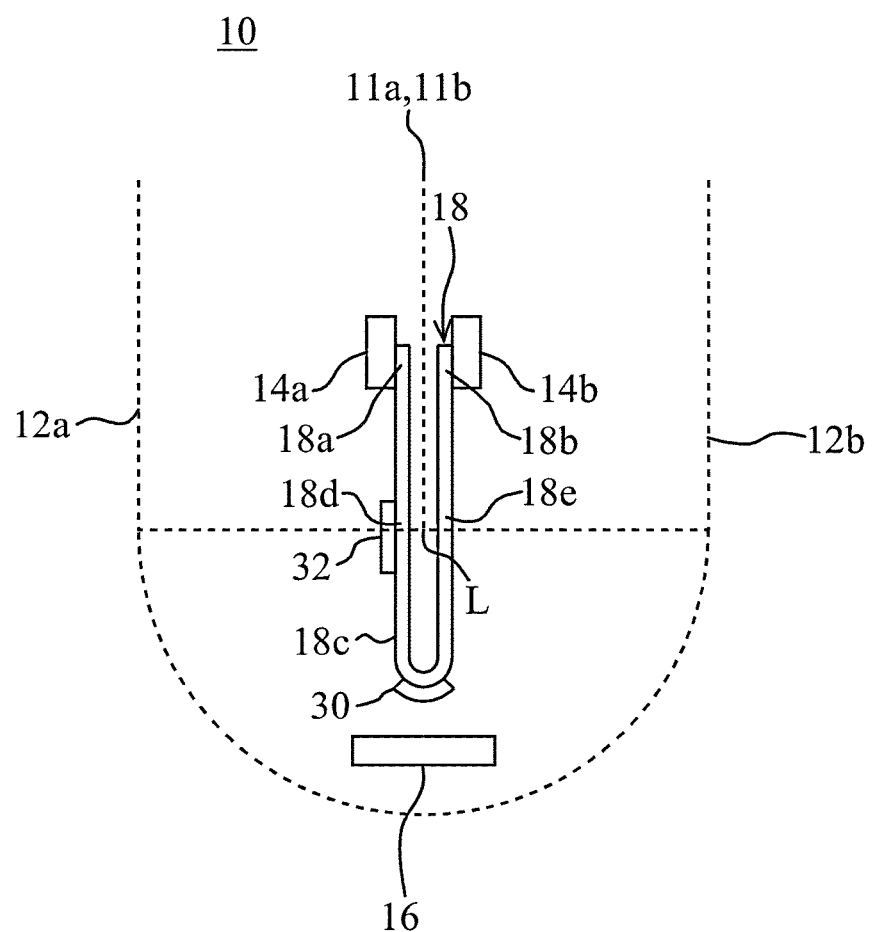
FIG. 7 is a sectional view of the vicinity of the coupling part between the first body 12a and the second body 12b of the electronic device 10.

The open angle θ decreases to the vicinity of the reference angle θ0 at time t2. At this time, as illustrated in FIG. 5, the first sensor 30 is pushed upward by the contact member 16. Therefore, the lower end part of the non-fixing part 18c receives an upward force from the contact member 16. It is noted that the flexible coupling member 18 moves upward as the first housing 14a and the second housing 14b move upward. As a result, the force with which the contact member 16 pushes the lower end part of the non-fixing part 18c upward decreases. This configuration causes the lower end part of the non-fixing part 18c to deform from a flat shape to a semicircular shape. Therefore, the first sensor 30 deforms such that the stretching amount of the first sensor 30 increases. At time t2, the first output value of the first detection signal Sig1 starts increasing from the reference voltage V0.

The open angle θ decreases between time t2 and time t3. At this time, the first sensor 30 separates from the contact member 16. Therefore, the first sensor 30 is not pushed upward by the contact member 16. Therefore, the lower end part of the non-fixing part 18c does not receive the upward force from the contact member 16. This causes the lower end part of the non-fixing part 18c to curve in a more semicircular shape. Therefore, the first sensor 30 deforms such that the stretching amount of the first sensor 30 increases between time t2 and time t3. The first output value of the first detection signal Sig1 increases between time t2 and time t3. Then, at time t3, the first output value of the first detection signal Sig1 takes a maximum value. The open angle θ at time t3 is the reference angle θ0. In this manner, the first output value of the first detection signal Sig1 takes a maximum value when the open angle θ is the reference angle θ0. The second output value of the second detection signal Sig2 keeps increasing between time t2 and time t3. Similarly, the second output integral value I2 of the second detection signal Sig2 keeps increasing.

The open angle θ decreases between time t3 and time t4. The first sensor 30 deforms such that the stretching amount of the first sensor 30 decreases between time t3 and time t4. Therefore, the first output value of the first detection signal Sig1 decreases between time t3 and time t4. Then, at time t4, the first output value of the first detection signal Sig1 becomes the reference voltage V0. The second output value of the second detection signal Sig2 keeps increasing between time t3 and time t4. Similarly, the second output integral value I2 of the second detection signal Sig2 keeps increasing.

The open angle θ decreases to 0° between time t4 and time t5. The first output value of the first detection signal Sig1 remains as the reference voltage V0 between time t4 and time t5. The second output value of the second detection signal Sig2 increases and then decreases between time t4 and time t5. At time t5, the second output value of the second detection signal Sig2 becomes the reference voltage V0. At time t5, the increase in the second output integral value I2 of the second detection signal Sig2 stops. As a result, the electronic device 10 closes.

Figure 9:
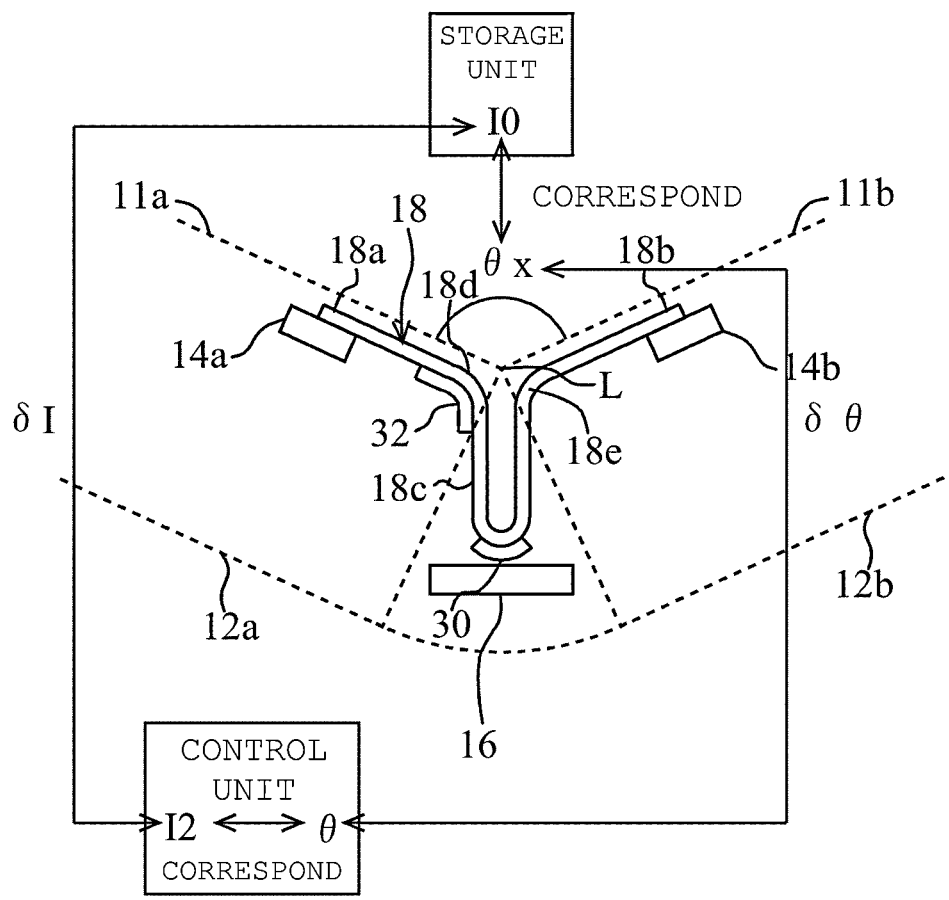
FIG. 9 is an explanatory diagram of a signal in the electronic device 10.
Figure 9:
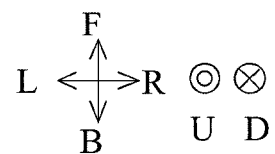

FIG. 9 is an explanatory diagram of a signal in the electronic device 10. In particular, the second output value of the second detection signal Sig2 is a voltage that changes with the angular velocity of the open angle θ. Therefore, it is difficult for the control unit 50 to directly calculate the open angle θ from the second output value of the second detection signal Sig2. Accordingly, the control unit 50 calculates the second output integral value I2 that is an integral value of the second output value of the second detection signal Sig2. Then, the control unit 50 calculates the open angle θ based on the second output integral value I2.

However, when the second detection signal Sig2 includes a noise, the second output integral value I2 includes the noise. As a result, the open angle θ calculated based on the second output integral value I2 deviates from the actual open angle θ (hereinafter, referred to as an actual open angle θx).

Accordingly, the control unit 50 is configured to calculate the open angle θ based on the first detection signal Sig1 and the second output integral value I2. Specifically, when the open angle θ changes from 180° to 0°, the first output value of the first detection signal Sig1 changes when the actual open angle θx is the reference angle θ0. That is, at time t3, the first output value of the first detection signal Sig1 takes a maximum value. This allows the control unit 50 to detect that the actual open angle θx has become the reference angle θ0 at time t3. Then, the control unit 50 acquires the second output integral value I2 at time t3.

Further, the control unit 50 is configured to calculate the open angle θ based on an integral difference δI obtained by subtracting the reference angle integral value I0 from the second output integral value I2 when it is detected that the open angle θ (i.e., the actual open angle θx) is the reference angle θ0 based on the first detection signal Sig1 (that is, time t3). The reference angle integral value I0 is the second output integral value I2 under a condition where there is no influence of noise or the like and under a condition where the actual open angle θx is the reference angle θ0. That is, the reference angle integral value I0 corresponds to a theoretical value of the second output integral value I2 corresponding to the reference angle θ0. The storage unit 52 stores the reference angle integral value I0. The integral difference δI is an error caused by the noise in the second output integral value I2. In the present embodiment, the control unit 50 calculates a corrected second output integral value AI2 by subtracting the integral difference δI from the second output integral value I2. As a result, the second output integral value I2 including the integral difference δI that is an error due to noise is corrected to the corrected second output integral value AI2 not including the integral difference δI that is an error due to noise. Then, the control unit 50 calculates the open angle θ based on the corrected second output integral value AI2.

[Control of Electronic Device 10]

Figure 10:
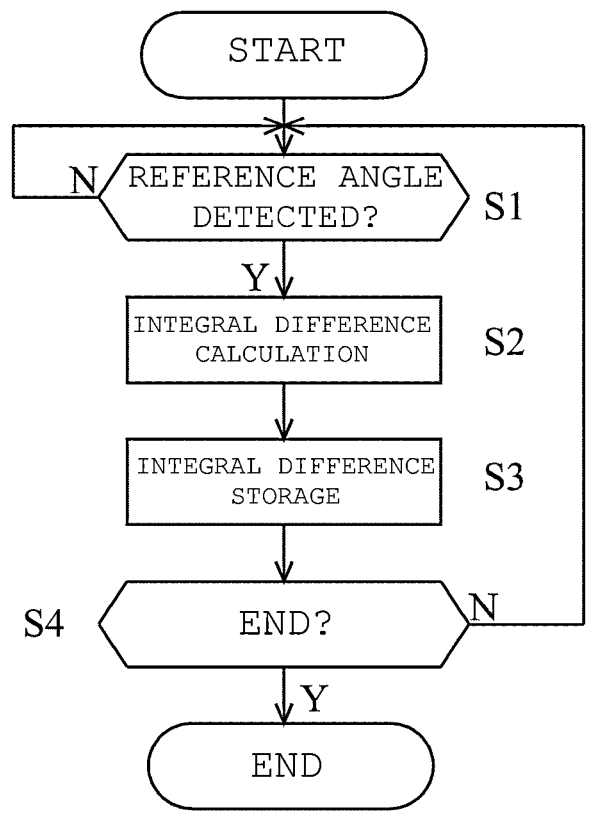
FIG. 10 is a flowchart executed by a control unit 50.
Figures 11, 12:
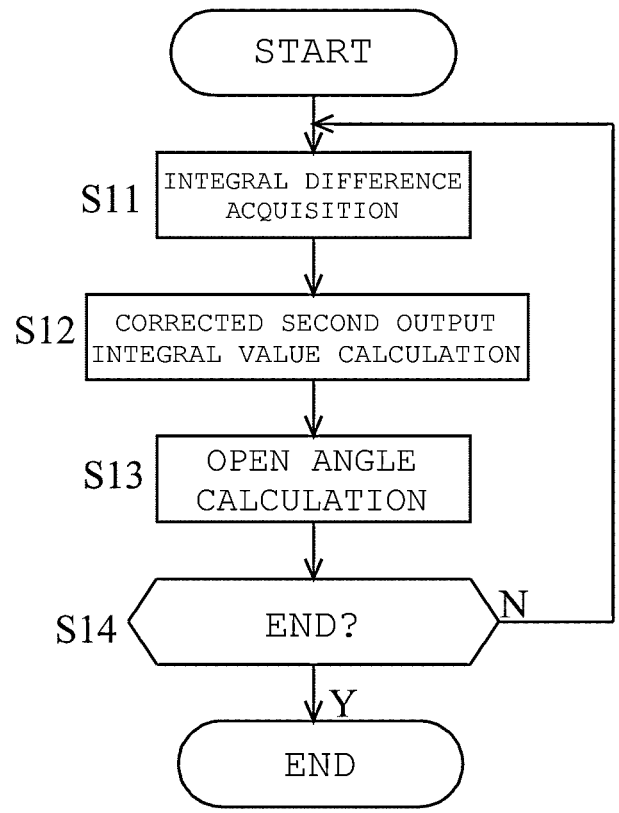
FIG. 11 is a flowchart executed by the control unit 50.
FIG. 12 is an open angle calculation table illustrating a relationship between a corrected second output integral value AI2 and an open angle θ.

Next, a control of the electronic device 10 will be described with reference to the drawings. FIGS. 10 and 11 are flowcharts executed by the control unit 50. The control unit 50 (e.g., a computer processor) executes the program stored in the storage unit 52 to execute the flowcharts illustrated in FIGS. 10 and 11 in an exemplary aspect.

First, the flowchart of FIG. 10 will be described. This processing starts when the power of the electronic device 10 is switched from off to on. The control unit 50 determines whether the open angle θ (i.e., the actual open angle θx) is the reference angle θ0 based on the first detection signal Sig1 (step S1). Specifically, the control unit 50 determines whether the waveform of the first detection signal Sig1 between time t2 and time t4 in FIG. 8 is detected. This determination is performed, for example, by the control unit 50 determining whether the first output value of the first detection signal Sig1 is larger than a threshold. When the open angle θ (i.e., the actual open angle θx) is the reference angle θ0, the processing proceeds to step S2. When the open angle θ (i.e., the actual open angle θx) is not the reference angle θ0, the processing returns to step S1.

When the open angle θ (i.e., the actual open angle θx) is the reference angle θ0, the control unit 50 calculates the integral difference δI (step S2). Specifically, the control unit 50 calculates the integral difference δI by subtracting the reference angle integral value I0 from the second output integral value I2. The integral difference δI is an error caused by a noise in the second output integral value I2. Then, the control unit 50 stores the integral difference δI in the storage unit 52 (step S3). When the integral difference δI is already stored in the storage unit 52, the control unit 50 updates the integral difference δI stored in the storage unit 52. Thereafter, the processing proceeds to step S4.

The control unit 50 determines whether to end the processing (step S4). Specifically, the control unit 50 determines whether the power of the electronic device 10 has been switched from on to off. When the processing is not ended, the processing returns to step S1. In this manner, the control unit 50 repeatedly executes the flowchart of FIG. 10 when the power of the electronic device 10 is on.

Next, the flowchart of FIG. 11 will be described. The control unit 50 repeatedly executes the flowchart of FIG. 11 when the power of the electronic device 10 is on. That is, the control unit 50 executes the flowchart of FIG. 10 and the flowchart of FIG. 11 in parallel.

This processing starts when the power of the electronic device 10 is switched from off to on. The control unit 50 acquires the integral difference δI stored in the storage unit 52 (step S11).

Next, the control unit 50 calculates the corrected second output integral value AI2 (step S12). Specifically, the control unit 50 calculates the corrected second output integral value AI2 by subtracting the integral difference δI acquired in step S11 from the second output integral value I2. As a result, the second output integral value I2 including the integral difference δI that is an error due to noise is corrected to the corrected second output integral value AI2 not including the integral difference δI that is an error due to noise.

Next, the control unit 50 calculates the open angle θ based on the corrected second output integral value AI2 acquired in step S12 (step S13). FIG. 12 is an open angle calculation table illustrating a relationship between the corrected second output integral value AI2 and the open angle θ. In this aspect, the storage unit 52 stores the open angle table illustrated in FIG. 12. The control unit 50 refers to the open angle table illustrated in FIG. 12 to specify the open angle θ corresponding to the corrected second output integral value AI2. Thereafter, the processing proceeds to step S14.

At this step, the control unit 50 determines whether to end the processing (step S14). Specifically, the control unit 50 determines whether the power of the electronic device 10 has been switched from on to off. When the processing is not ended, the processing returns to step S11. In this manner, the control unit 50 repeatedly executes the flowchart of FIG. 11 when the power of the electronic device 10 is on.

[Technical Effects]

According to the electronic device 10, the open angle θ formed by the first body 12a and the second body 12b can be accurately calculated. More specifically, the second sensor 32 outputs the second detection signal Sig2 having the second output value used for calculating the open angle θ that changes as the second body 12b rotates with respect to the first body 12a as described above. Such a second detection signal Sig2 includes a noise in some cases. Therefore, when the control unit 50 calculates the open angle θ based only on the second detection signal Sig2, the open angle θ calculated by the control unit 50 deviates from the actual open angle θx due to the noise in some cases. In particular, the control unit 50 calculates the second output integral value I2 that is an integrated value of the second output value of the second detection signal Sig2. When the second detection signal Sig2 includes a noise, the control unit 50 integrates the noise as a part of the second output value. Therefore, when the control unit 50 calculates the open angle θ based only on the second output integral value I2, the open angle θ deviates from the actual open angle θx in some cases.

Accordingly, the first sensor 30 outputs the first detection signal Sig1 having the first output value indicating that the open angle θ is the reference angle θ0. Then, the control unit 50 calculates the open angle θ based on the first detection signal Sig1 and the second detection signal Sig2. In particular, the control unit 50 calculates the open angle θ based on the first detection signal Sig1 and the second output integral value I2. This allows the control unit 50 to detect the reference angle θ0. Then, the control unit 50 can calculate the open angle θ with reference to the reference angle θ0. This allows the control unit 50 to accurately calculate the open angle θ formed by the first body 12a and the second body 12b.

The electronic device 10 can accurately calculate the open angle θ formed by the first body 12a and the second body 12b also for the following reason. More specifically, the non-fixing part 18c is provided between the first fixing part 18a and the second fixing part 18b. The non-fixing part 18c is not fixed to the first body 12a or the second body 12b. Therefore, the non-fixing part 18c is configured to deform in a mode different from a continuous operation in which the second body 12b rotates with respect to the first body 12a. The deformation of the non-fixing part 18c in a mode different from the continuous operation in which the second body 12b rotates with respect to the first body 12a is, for example, discontinuous deformation. This configuration allows the non-fixing part 18c to undergo a characteristic deformation when the open angle θ formed by the first body 12a and the second body 12b is the reference angle θ0. Therefore, the first sensor 30 can output the first detection signal Sig1 having the first output value indicating that the open angle θ formed by the first body 12a and the second body 12b is the reference angle θ0. As a result, the control unit 50 can detect the reference angle θ0. Then, the control unit 50 can calculate the open angle θ with reference to the reference angle θ0. This allows the control unit 50 to accurately calculate the open angle θ formed by the first body 12a and the second body 12b.

According to the electronic device 10, the first output value of the first detection signal Sig1 takes a maximum value when the open angle θ is the reference angle θ0. This allows the control unit 50 to easily detect the reference angle θ0.

According to the electronic device 10, the open angle θ formed by the first body 12a and the second body 12b can be calculated more accurately. The second sensor 32 is attached to the left curved part 18d. The angle formed by the left curved part 18d changes as the open angle θ changes. Therefore, the second sensor 32 outputs the second detection signal Sig2 having the second output value used for calculating the open angle θ that changes as the second body 12b rotates with respect to the first body 12a. As a result, the control unit 50 can calculate the open angle θ based on the first detection signal Sig1 and the second detection signal Sig2 according to the exemplary aspect.

According to the electronic device 10, the open angle θ formed by the first body 12a and the second body 12b can be calculated more accurately. More specifically, as described above, the first sensor 30 is attached to the lower end part of the non-fixing part 18c. The lower end part of the non-fixing part 18c is a part that undergoes a characteristic deformation in the flexible coupling member 18 when the open angle θ formed by the first body 12a and the second body 12b is the reference angle θ0. Therefore, the first sensor 30 easily outputs the first detection signal Sig1 having the first output value indicating that the open angle θ formed by the first body 12a and the second body 12b is the reference angle θ0. As a result, the control unit 50 can accurately detect the reference angle θ0. Then, the control unit 50 can accurately calculate the open angle θ with reference to the reference angle θ0. This allows the control unit 50 to calculate the open angle θ formed by the first body 12a and the second body 12b with higher accuracy.

According to the electronic device 10, the open angle θ formed by the first body 12a and the second body 12b can be calculated more accurately. More specifically, when the open angle θ changes, a state in which the non-fixing part 18c receives a force from the contact member 16 and a state in which the non-fixing part 18c does not receive a force from the contact member 16 are switched. This configuration causes the non-fixing part 18c to undergo a characteristic deformation when the state of the non-fixing part 18c is switched from the state where the non-fixing part 18c receives a force from the contact member 16 to the state where the non-fixing part 18c does not receive a force from the contact member 16. Therefore, the first sensor 30 easily outputs the first detection signal Sig1 having the first output value indicating that the open angle θ formed by the first body 12a and the second body 12b is the reference angle θ0. As a result, the control unit 50 can accurately detect the reference angle θ0. Then, the control unit 50 can accurately calculate the open angle θ with reference to the reference angle θ0. This allows the control unit 50 to calculate the open angle θ formed by the first body 12a and the second body 12b with higher accuracy.

First Modification

Hereinafter, an electronic device 10a according to a first modification of the exemplary aspect will be described with reference to the drawings. FIG. 13 is an open angle calculation table illustrating a relationship between the second output integral value I2 and the open angle θ. FIG. 1 is employed as a configuration diagram of the electronic device 10a. FIG. 2 is employed as a sectional view of the vicinity of the coupling part between the first body 12a and the second body 12b of the electronic device 10a.

The electronic device 10a is different from the electronic device 10 in the method of calculating the open angle θ. More specifically, as illustrated in FIG. 13, the storage unit 52 stores a plurality of open angle calculation tables indicating the relationship between the open angle θ and the second output integral value I2. As illustrated in the upper part of each open angle calculation table, each open angle calculation table is associated with the second output integral value I2. The second output integral value I2 associated with each open angle calculation table is referred to as an index integral value II. The index integral value II is the second output integral value I2 at the time when the control unit 50 detects that the open angle θ is the reference angle θ0 based on the first detection signal Sig1. FIG. 13 illustrates three types of open angle calculation tables in which the index integral values II are Ia, Ib, and Ic. It is also noted that the storage unit 52 can be configured to store more open angle calculation tables in practice.

As the index integral value II increases, the index integral value II includes more noise. Therefore, the open angle θ calculated by the second output integral value I2 becomes larger than the actual open angle θx. Therefore, in the plurality of open angle calculation tables, when the index integral value II increases, the second output integral value I2 in the open angle calculation table tends to increase as a whole. Therefore, when the relationship of Ia<Ib<Ic< . . . is established, the relationship of a11<a21<a31< . . . , the relationship of a12<a22<a32< . . . , and the relationships of a13<a23<a33< . . . and a14<a24<a34< . . . are established.

According to an exemplary aspect, the control unit 50 can be configured to select any one open angle calculation table from the plurality of open angle calculation tables based on the second output integral value I2 at the time when the control unit 50 detects that the open angle θ is the reference angle θ0 based on the first detection signal Sig1. Specifically, the control unit 50 calculates the second output integral value I2 at the time when detecting that the open angle θ is the reference angle θ0 based on the first detection signal Sig1. Further, the control unit 50 selects the open angle calculation table associated with the index integral value II that matches the calculated second output integral value I2. Then, the control unit 50 calculates the open angle θ using the selected open angle calculation table.

Figure 14:
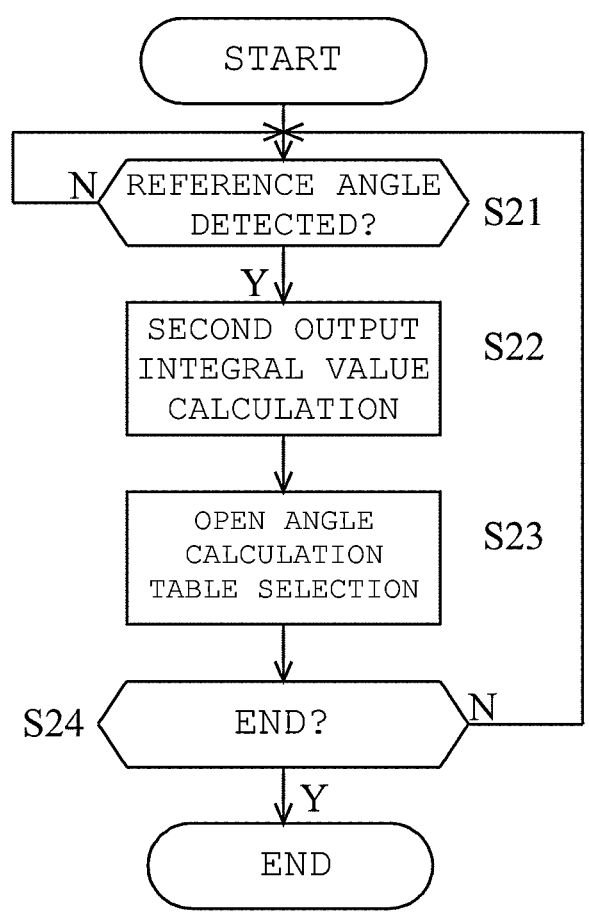
FIG. 14 is a flowchart executed by the control unit 50.
Figure 15:
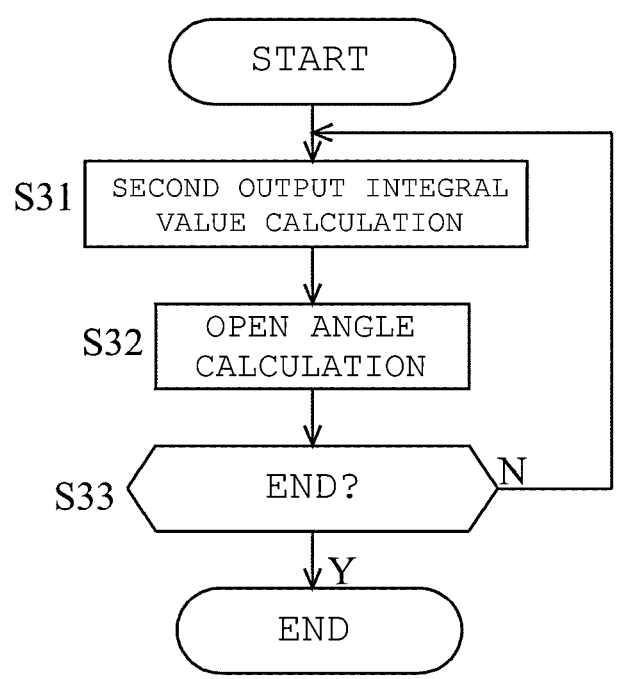
FIG. 15 is a flowchart executed by the control unit 50.

Next, a control of the electronic device 10a will be described with reference to the drawings. FIGS. 14 and 15 are flowcharts executed by the control unit 50. The control unit 50 (e.g., a computer processor) can be configured to execute the program stored in the storage unit 52 to execute the flowcharts illustrated in FIGS. 14 and 15.

First, the flowchart of FIG. 14 will be described. This processing starts when the power of the electronic device 10a is switched from off to on. The control unit 50 determines whether the open angle θ (i.e., the actual open angle θx) is the reference angle θ0 based on the first detection signal Sig1 (step S21). Step 21 is the same as step S1, and thus the description thereof is omitted. When the open angle θ (i.e., the actual open angle θx) is the reference angle θ0, the processing proceeds to step S22. When the open angle θ (i.e., the actual open angle θx) is not the reference angle θ0, the processing returns to step S21.

When the open angle θ (i.e., the actual open angle θx) is the reference angle θ0, the control unit 50 calculates the second output integral value I2 based on the second detection signal Sig2 (step S22). The control unit 50 selects the open angle calculation table (step S23). The control unit 50 selects the open angle calculation table associated with the index integral value II that matches the second output integral value I2 calculated in step S22. Thereafter, the processing proceeds to step S24.

The control unit 50 determines whether to end the processing (step S24). Specifically, the control unit 50 determines whether the power of the electronic device 10a has been switched from on to off. When the processing is not ended, the processing returns to step S21. In this manner, the control unit 50 repeatedly executes the flowchart of FIG. 14 when the power of the electronic device 10a is on.

Next, the flowchart of FIG. 15 will be described. The control unit 50 repeatedly executes the flowchart of FIG. 15 when the power of the electronic device 10a is on. That is, the control unit 50 can be configured to execute the flowchart of FIG. 14 and the flowchart of FIG. 15 in parallel in an exemplary aspect.

This processing starts when the power of the electronic device 10a is switched from off to on. The control unit 50 calculates the second output integral value I2 (step S31).

Next, the control unit 50 calculates the open angle θ (step S32). More specifically, the control unit 50 specifies the open angle θ corresponding to the second output integral value I2 calculated in step S31 using the open angle calculation table selected in step S23. Thereafter, the processing proceeds to step S33.

The control unit 50 determines whether to end the processing (step S33). Specifically, the control unit 50 determines whether the power of the electronic device 10a has been switched from on to off. When the processing is not ended, the processing returns to step S31. In this manner, the control unit 50 repeatedly executes the flowchart of FIG. 15 when the power of the electronic device 10a is on.

In the electronic device 10a as described above as well, similarly to the electronic device 10, the open angle θ formed by the first body 12a and the second body 12b can be accurately calculated.

Second Modification

Figure 16:
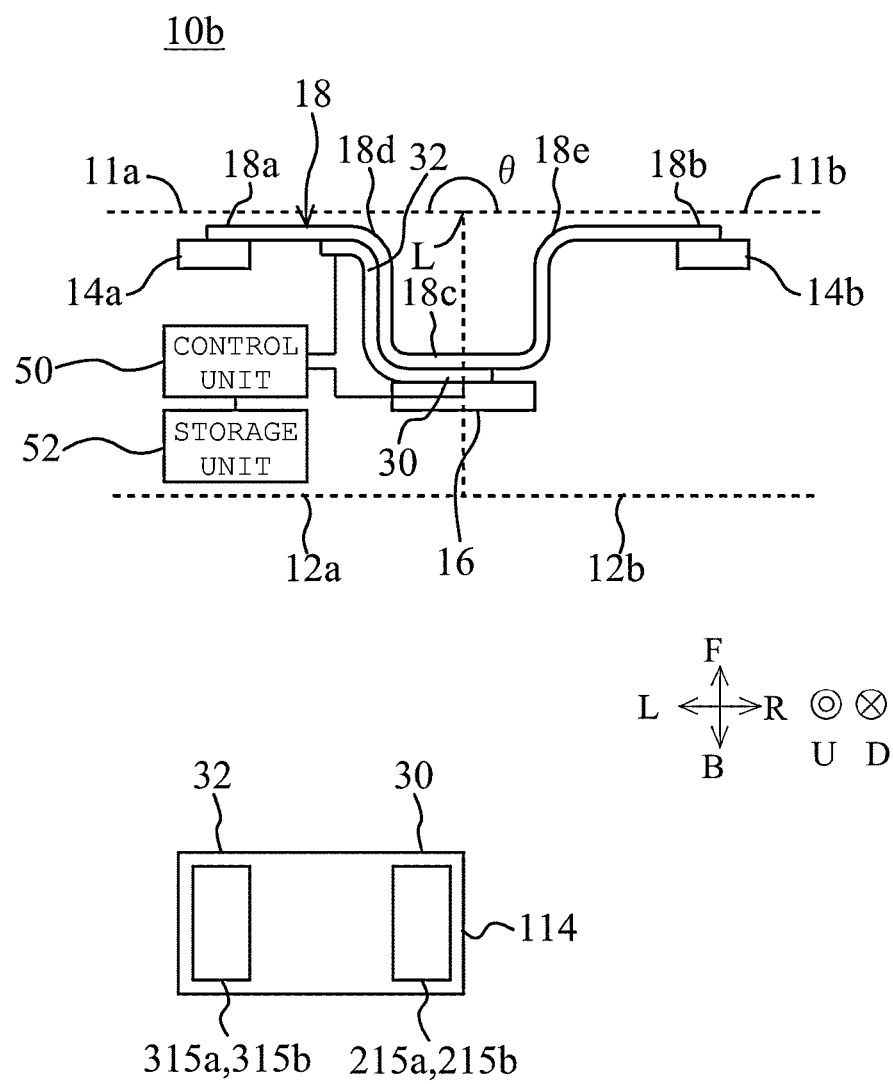
FIG. 16 is a sectional view of the vicinity of a coupling part between the first body 12a and the second body 12b of an electronic device 10b.

Hereinafter, an electronic device 10b according to a second modification of the exemplary aspect will be described with reference to the drawings. FIG. 16 is a sectional view of the vicinity of a coupling part between the first body 12a and the second body 12b of the electronic device 10b.

The electronic device 10b is different from the electronic device 10 in the structure of the first sensor 30 and the second sensor 32. More specifically, in the electronic device 10b, the piezoelectric body 114 of the first sensor 30 and the piezoelectric body 114 of the second sensor 32 are connected together. It is also noted that the upper electrode 215a and the lower electrode 215b of the first sensor 30 overlap the lower end part of the non-fixing part 18c. The upper electrode 315a and the lower electrode 315b of the second sensor 32 overlap the left curved part 18d. This configuration allows the first sensor 30 to output the first detection signal Sig1 having the first output value indicating that the open angle θ formed by the first body 12a and the second body 12b is the reference angle θ0. The second sensor 32 can output the second detection signal Sig2 having the second output value used for calculating the open angle θ that changes as the second body 12b rotates with respect to the first body 12a. Other structures of the electronic device 10b are the same as those of the electronic device 10, and thus the description thereof is omitted.

Third Modification

Figure 17:
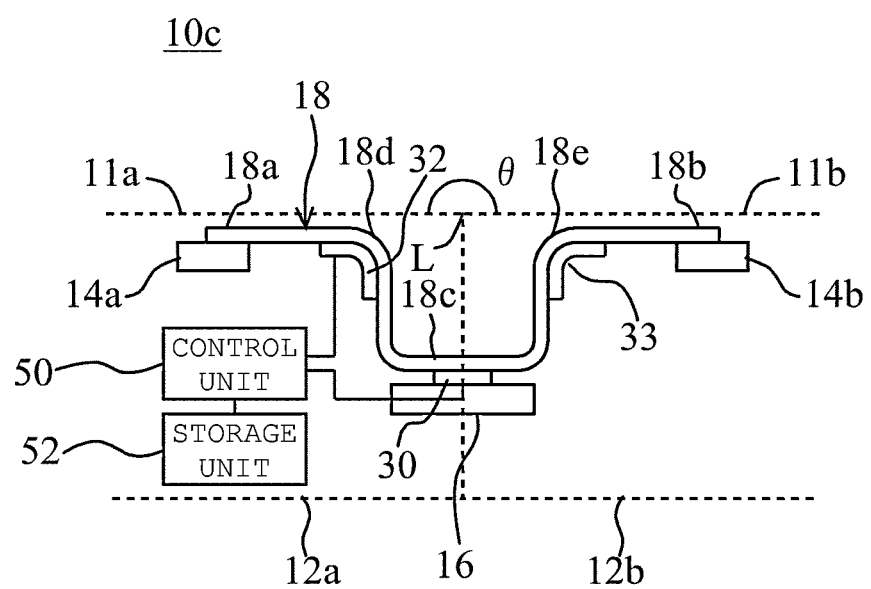
FIG. 17 is a sectional view of the vicinity of a coupling part between the first body 12a and the second body 12b of an electronic device 10c.
Figure 17:
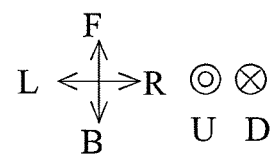

Hereinafter, an electronic device 10c according to a third modification of the exemplary aspect will be described with reference to the drawings. FIG. 17 is a sectional view of the vicinity of a coupling part between the first body 12a and the second body 12b of the electronic device 10c.

The electronic device 10c is different from the electronic device 10 in that the electronic device 10c further includes a second sensor 33. The second sensor 33 is attached to the right curved part 18e. Similarly to the second sensor 32, the second sensor 33 outputs the second detection signal Sig2 having the second output value used for calculating the open angle θ that changes as the second body 12b rotates with respect to the first body 12a. This configuration allows the control unit 50 to calculate the open angle θ based on the second detection signal Sig2 output from the second sensor 32 and the second detection signal Sig2 output from the second sensor 33. As a result, the control unit 50 can calculate the open angle θ with higher accuracy. Other structures of the electronic device 10c are the same as those of the electronic device 10, and thus the description thereof will be omitted.

Fourth Modification

Figure 18:
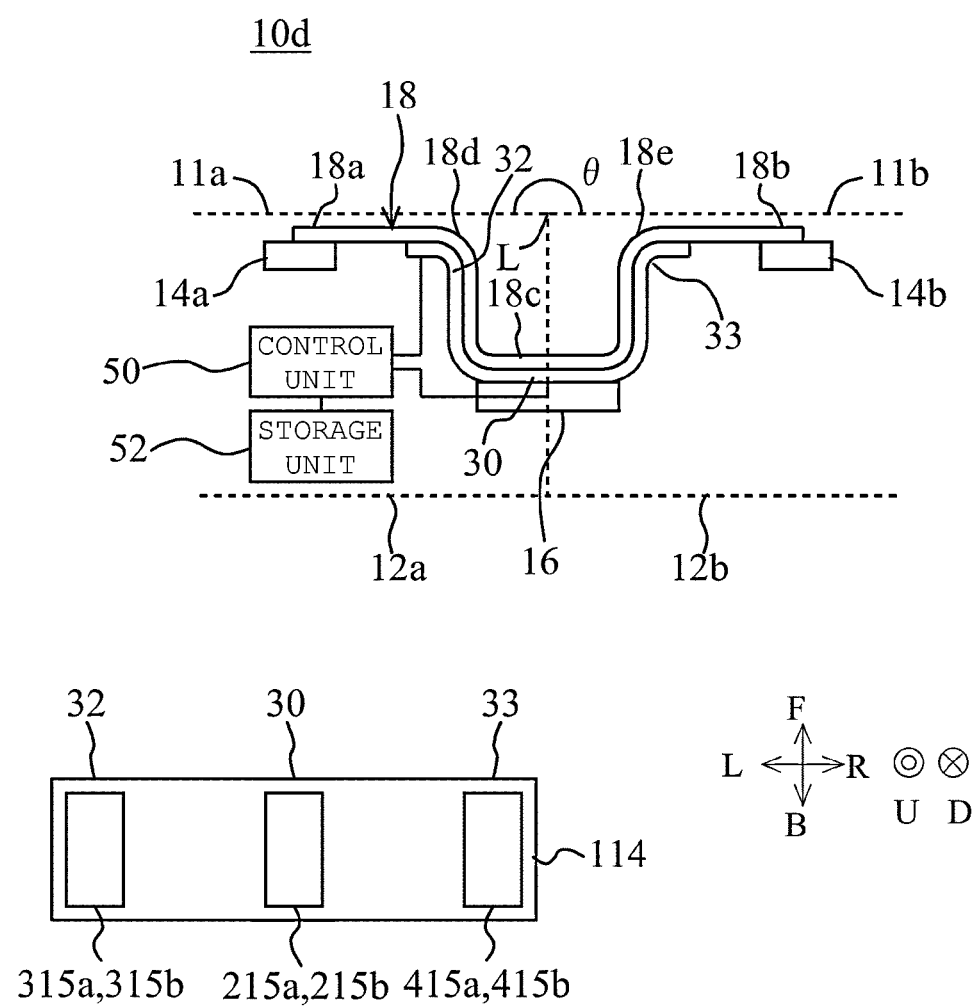
FIG. 18 is a sectional view of the vicinity of a coupling part between the first body 12a and the second body 12b of an electronic device 10d.

Hereinafter, an electronic device 10d according to a fourth modification of the exemplary aspect will be described with reference to the drawings. FIG. 18 is a sectional view of the vicinity of a coupling part between the first body 12a and the second body 12b of the electronic device 10d.

The electronic device 10d is different from the electronic device 10c in the structure of the first sensor 30 and the second sensors 32, 33. More specifically, in the electronic device 10d, the piezoelectric body 114 of the first sensor 30, the piezoelectric body 114 of the second sensor 32, and the piezoelectric body 114 of the second sensor 33 are connected together. Note that the upper electrode 215a and the lower electrode 215b of the first sensor 30 overlap the lower end part of the non-fixing part 18c. The upper electrode 315a and the lower electrode 315b of the second sensor 32 overlap the left curved part 18d. Moreover, the upper electrode 415a and the lower electrode 415b of the second sensor 33 overlap the right curved part 18e. Other structures of the electronic device 10d are the same as those of the electronic device 10c, and thus the description thereof is omitted.

Fifth Modification

Figure 19:
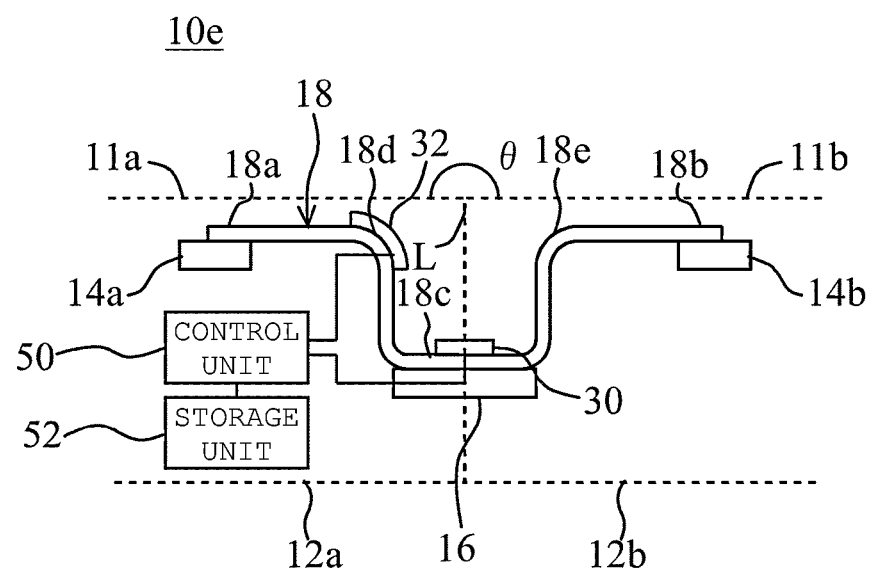
FIG. 19 is a sectional view of the vicinity of a coupling part between the first body 12a and the second body 12b of an electronic device 10e.
Figure 19:
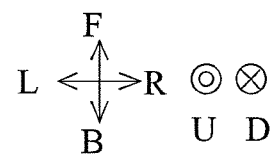

Hereinafter, an electronic device 10e according to a fifth modification of the exemplary aspect will be described with reference to the drawings. FIG. 19 is a sectional view of the vicinity of a coupling part between the first body 12a and the second body 12b of the electronic device 10e.

The electronic device 10e is different from the electronic device 10 in positions where the first sensor 30 and the second sensor 32 are attached. The first sensor 30 is attached to the inner peripheral face of the lower end part of the non-fixing part 18c. The second sensor 32 is attached to the outer peripheral face of the left curved part 18d. Accordingly, the polarity of the first output value of the first detection signal Sig1 output from first sensor 30 of the electronic device 10e is opposite to the polarity of the first output value of the first detection signal Sig1 output from the first sensor 30 of the electronic device 10. The polarity of the second output value of the second detection signal Sig2 output from the second sensor 32 of the electronic device 10e is opposite to the polarity of the second output value of the second detection signal Sig2 output from the second sensor 32 of the electronic device 10. Other structures of the electronic device 10e are the same as those of the electronic device 10, and thus the description thereof is omitted.

Sixth Modification

Figure 20:
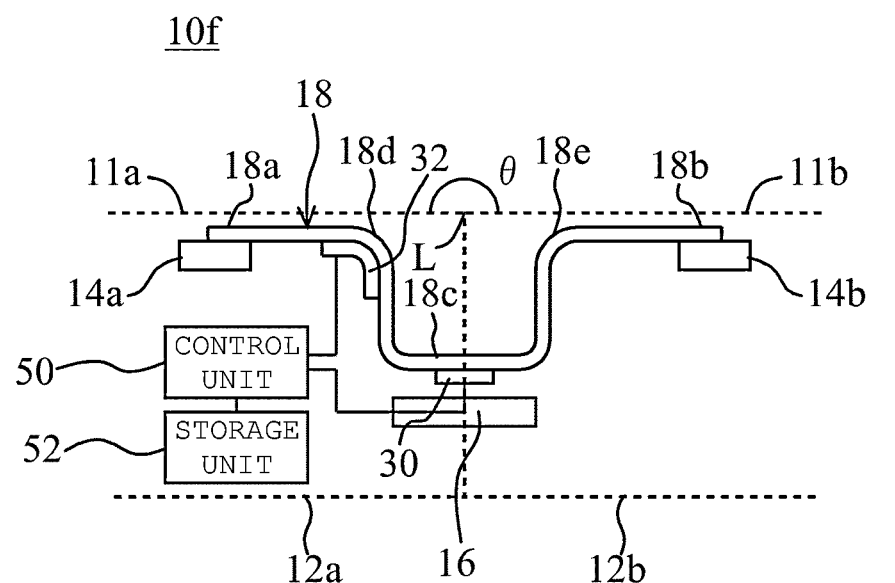
FIG. 20 is a sectional view of the vicinity of a coupling part between the first body 12a and the second body 12b of an electronic device 10f.
Figure 20:
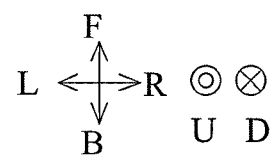

Hereinafter, an electronic device 10f according to a sixth modification of the exemplary aspect will be described with reference to the drawings. FIG. 20 is a sectional view of the vicinity of a coupling part between the first body 12a and the second body 12b of the electronic device 10f.

The electronic device 10f is different from the electronic device 10 in that the first sensor 30 and the flexible coupling member 18 do not contact with the contact member 16. That is, the first sensor 30 and the flexible coupling member 18 do not receive a force from the contact member 16. When the first sensor 30 and the flexible coupling member 18 do not contact with the contact member 16 in this manner as well, the shape of the non-fixing part 18c changes as the open angle θ changes. Therefore, the first sensor 30 outputs the first detection signal Sig1 having the first output value indicating that the open angle θ formed by the first body 12a and the second body 12b is the reference angle θ0. It is noted that other structures of the electronic device 10f are the same as those of the electronic device 10, and thus the description thereof is omitted.

Seventh Modification

Figure 21:
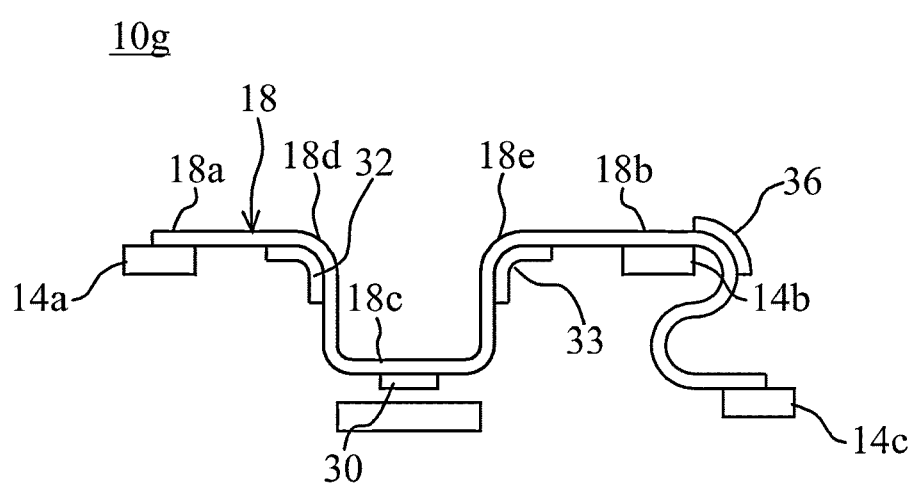
FIG. 21 is a sectional view of the vicinity of a coupling part between the first body 12a and the second body 12b of an electronic device 10g.
Figure 22:
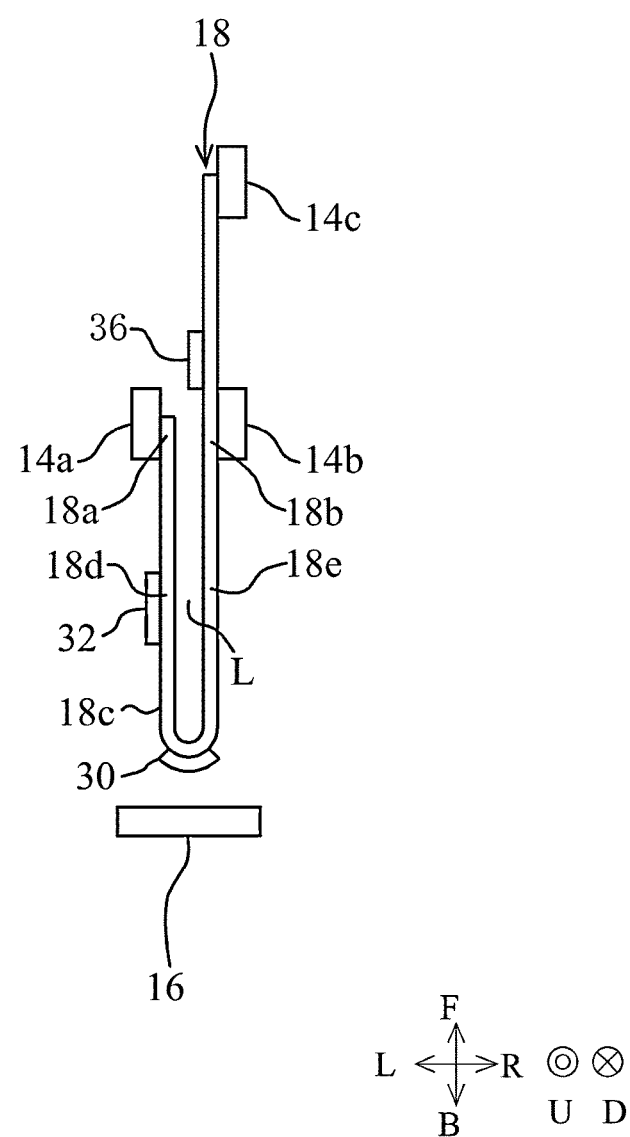
FIG. 22 is a sectional view of the vicinity of the coupling part between the first body 12a and the second body 12b of the electronic device 10g.

Hereinafter, an electronic device 10g according to a seventh modification of the exemplary aspect will be described with reference to the drawings. FIGS. 21 and 22 are sectional views of the vicinity of a coupling portion between the first body 12a and the second body 12b of the electronic device 10g.

It is noted that the electronic device 10g is different from the electronic device 10 in that the electronic device 10g further includes a third housing 14c and a third sensor 36. The third housing 14c is located on the right of the second housing 14b. Specifically, the third housing 14c is located at the lower right of the second housing 14b. A right end part of the flexible coupling member 18 is fixed to the third housing 14c. The flexible coupling member 18 is curved between the second housing 14b and the third housing 14c. The third sensor 36 is attached to a part of the flexible coupling member 18 located between the second housing 14b and the third housing 14c.

In addition, in the electronic device 10g, when the first body 12a and the second body 12b are fully closed, the flexible coupling member 18 has a U shape as viewed in the front-back direction. The second sensor 32 and the third sensor 36 may be attached anywhere on the flexible coupling member 18 as long as the second detection signal Sig2 having the second output value used for calculating the open angle θ that changes as the second body 12b rotates with respect to the first body 12a is output as described above.

Additional Exemplary Embodiments

In general, it is noted that the electronic device according to the present invention is not limited to the electronic devices 10, 10a to 10g, and can be modified within the scope of the gist thereof. In addition, the configurations of the electronic devices 10, 10a to 10g may be freely combined.

The flexible coupling member 18 is a flexible wiring. However, the flexible coupling member 18 may be any member having flexibility in alternative aspects. Therefore, the flexible coupling member 18 may be a flexible sheet including no wiring. The flexible coupling member 18 may be a cable incorporating a wiring. In one aspect, the cable has a circular sectional shape.

Moreover, it is sufficient that the first sensor 30 outputs the first detection signal Sig1 having the first output value indicating that the open angle θ is the reference angle θ0. Therefore, the first sensor 30 may be a mechanical switch that can be switched between on and off. The first sensor 30, the second sensors 32, 33, and the third sensor 36 may be strain sensors. The second sensors 32, 33 and the third sensor 36 may be acceleration sensors, gyro sensors, magnetic sensors, and the like included in the electronic devices 10, 10a to 10g.

It is also noted that the second sensor 32 does not have to be attached to the flexible coupling member 18. For example, the second sensor 32 may be attached to the flexible display 11 or may be attached across the first body 12a and the second body 12b.

The electronic devices 10, 10a to 10g are not limited to smartphones. The electronic devices 10, 10a to 10g may be devices including the first body 12a and the second body 12b. Such a device is, for example, a laptop computer, a robot arm, or the like. Therefore, the flexible display 11 is not essential. The electronic devices 10, 10a to 10g do not have to include the first display 11a and/or the second display 11b.

In the electronic devices 10, 10a to 10g, the lower end part of the non-fixing part 18c may have a structure that is less likely to deform than the remaining part of the non-fixing part 18c. When the first sensor 30 is attached to the lower end part of the non-fixing part 18c, the lower end part of the non-fixing part 18c is less likely to deform than the remaining part of the non-fixing part 18c.

The second output value of the second detection signal Sig2 may change under the influence of the open angle θ. Therefore, the control unit 50 may calculate the open angle θ based on the second output value of the second detection signal Sig2 without integrating the second output value of the second detection signal Sig2.

The first output value of the first detection signal Sig1 does not have to take the maximum value when the open angle θ is the reference angle θ0.

The control unit 50 may detect that the open angle θ is the reference angle θ0 based on the integral value (first output integral value I1) of the first output value of the first detection signal Sig1 in FIG. 8.

In one aspect, the first sensor 30 may be attached to a part other than the lower end part of the non-fixing part 18c.

The first detection signal Sig1 having the first output value indicating that the open angle θ is the reference angle θ0 means that it is sufficient that the control unit 50 can detect that the open angle θ is the reference angle θ0 based on the first output value. Therefore, the waveform of the first detection signal Sig1 is not limited to the waveform illustrated in FIG. 8.

The second detection signal Sig2 having the second output value used for calculating the open angle θ that changes as the second body 12b rotates with respect to the first body 12a means that it can be used to calculate the angle between the upper limit value (for example, 180°) and the lower limit value (for example, 0°) of the open angle θ. Therefore, the second detection signal Sig2 having the second output value used for calculating the open angle θ that changes as the second body 12b rotates with respect to the first body 12a does not include, for example, a case where the second output value takes only two values of Hi and Low. This is because when the second output value takes only two values of Hi and Low, the second output value cannot be used for calculating the angle between the upper limit value (for example, 180°) and the lower limit value (for example, 0°) of the open angle θ. In addition, it is noted that "the second detection signal Sig2 having the second output value used for calculating the open angle θ that changes as the second body 12b rotates with respect to the first body 12a" may include a case where the second output value does not change when the open angle θ changes. For example, when the second output value changes with the angular velocity of the open angle θ, if the angular velocity of the open angle θ is constant, the open angle θ changes, and the second output value does not change.

DESCRIPTION OF REFERENCE SYMBOLS 10, 10a to 10g: Electronic device
11: Flexible display
11a: First display
11b: Second display
12a: First body
12b: Second body
14a: First housing
14b: Second housing
14c: Third housing
16: Contact member
18: Flexible coupling member
18a: First fixing part
18b: Second fixing part
18c: Non-fixing part 18d: Left curved part
18e: Right curved part
30: First sensor
32, 33: Second sensor
36: Third sensor
50: Control unit
52: Storage unit
AI2: Corrected second output integral value
I0: Reference angle integral value
I1: First output integral value
I2: Second output integral value
II: Index integral value
L: Center axis
S1D: First lower main face
S2U: Second upper main face
SF1: Upper main face
S1U: First upper main face
SF2: Lower main face
S2D: Second lower main face
Sig1: First detection signal
Sig2: Second detection signal
V0: Reference voltage
δI: Integral difference
θ: Open angle
θ0: Reference angle
θx: Actual open angle

The invention claimed is:

1. An electronic device comprising:
a first body;
a second body configured to rotate about a central axis with respect to the first body;
a flexible coupling member including a first fixing part coupled to the first body, a second fixing part coupled to the second body, and a non-fixing part disposed between the first fixing part and the second fixing part and that is not fixed to the first body or the second body, the flexible coupling member configured to deform when the second body rotates about the central axis with respect to the first body; and
a first sensor coupled to the non-fixing part and configured to output a first detection signal having a first output value that indicates that an open angle between the first body and the second body about the central axis is a reference angle when the non-fixing part deforms.

2. The electronic device according to claim 1, wherein the first output value of the first detection signal takes a maximum value when the open angle is the reference angle.

3. The electronic device according to claim 1, wherein:
the central axis extends in a front-back direction of the electronic device,
an up-down direction is a direction in which a bisector of the open angle extends as viewed in the front-back direction,
a left-right direction is a direction that is orthogonal to the front-back direction and the up-down direction,
the second body is located on a right side of the first body, and
the non-fixing part is curved so as to protrude downward from the first fixing part and the second fixing as viewed in a front-rear direction.

4. The electronic device according to claim 3, wherein:
a left part of the non-fixing part has a left curved part that is bent leftward as viewed in the front-back direction when the open angle is 180°, and
a right part of the non-fixing part has a right curved part that is bent rightward as viewed in the front-back direction when the open angle is 180°.

5. The electronic device according to claim 4, further comprising a control unit configured to detect that the open angle between the first body and the second body about the central axis is the reference angle based on the first detection signal.

6. The electronic device according to claim 5, further comprising a second sensor configured to output a second detection signal having a second output value configured for calculating the open angle that changes as the second body rotates with respect to the first body about the central axis.

7. The electronic device according to claim 6, wherein the second sensor is attached to the left curved part or the right curved part of the non-fixing part.

8. The electronic device according to claim 4, wherein the first sensor is attached to a lower end part of the non-fixing part.

9. The electronic device according to claim 3, further comprising:
a contact member coupled to the non-fixing part,
wherein a state in which the non-fixing part receives a force from the contact member and a state in which the non-fixing part does not receive a force from the contact member are switched when the open angle changes.

10. The electronic device according to claim 6, wherein the second output value is a voltage that changes based on an angular velocity of the open angle.

* * * * *